(No Model.)

J. E. DONOVAN.
APPARATUS FOR FORMING PULLEY MOLDS.

No. 593,644.

Patented Nov. 16, 1897.

WITNESSES
Howard H. Ralston
Emma Lyford

INVENTOR
John E. Donovan
By Geo. J. Murray
Atty (No Model.) 7 Sheets—Sheet 2.

J. E. DONOVAN.
APPARATUS FOR FORMING PULLEY MOLDS.

No. 593,644. Patented Nov. 16, 1897.

WITNESSES.
Howard H. Ralston
Emma Lyford

INVENTOR.
John E. Donovan
By Geo. J. Murray
Atty (No Model.) 7 Sheets—Sheet 3.

J. E. DONOVAN.
APPARATUS FOR FORMING PULLEY MOLDS.

No. 593,644. Patented Nov. 16, 1897.

WITNESSES.
Howard H. Ralston.
Emma Lyford.

INVENTOR.
John E. Donovan
By Geo. J. Murray
Atty.

(No Model.) 7 Sheets—Sheet 4.
J. E. DONOVAN.
APPARATUS FOR FORMING PULLEY MOLDS.
No. 593,644. Patented Nov. 16, 1897.
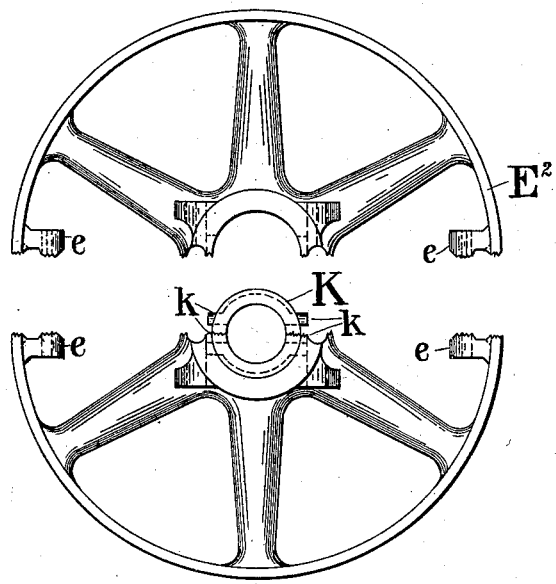
FIG. 13.
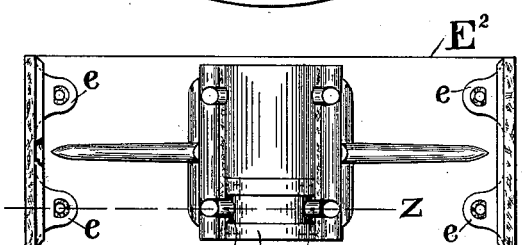
FIG. 14.
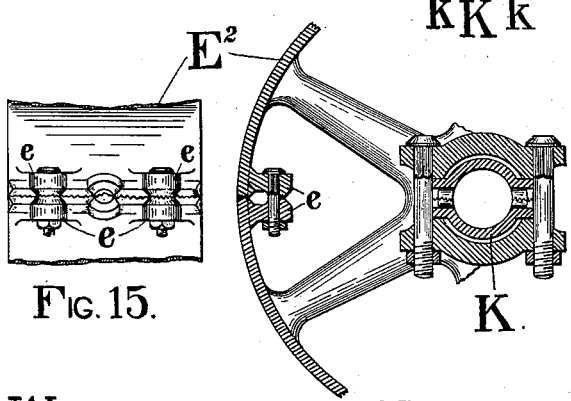
FIG. 15.
FIG. 16.
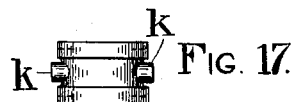
FIG. 17.
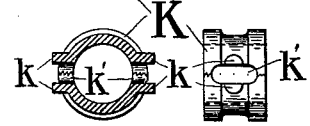
FIG. 18. FIG. 19.
WITNESSES.
Howard H. Rakestraw
Emma Lyford
INVENTOR.
John E. Donovan
By Geo. J. Murray
Atty (No Model.) 7 Sheets—Sheet 5.
J. E. DONOVAN.
APPARATUS FOR FORMING PULLEY MOLDS.

No. 593,644. Patented Nov. 16, 1897.

Witnesses.
Howard H. Ralston.
Emma Lyford.

Inventor.
John E. Donovan
By Geo. J. Murray
Atty.

(No Model.) 7 Sheets—Sheet 6.

J. E. DONOVAN.
APPARATUS FOR FORMING PULLEY MOLDS.

No. 593,644. Patented Nov. 16, 1897.

Witnesses.
Howard H. Ralston.
Emma Lyford

Inventor.
John E. Donovan
By Geo. J. Murray
Atty

THE NORRIS PETERS CO., PHOTO-LITHO., WASHINGTON, D. C.

(No Model.) 7 Sheets—Sheet 7.

J. E. DONOVAN.
APPARATUS FOR FORMING PULLEY MOLDS.

No. 593,644. Patented Nov. 16, 1897.

Witnesses—
Howard H. Ralston
Emma Lyford

Inventor—
John E. Donovan
By Geo. J. Murray
Atty

UNITED STATES PATENT OFFICE.

JOHN E. DONOVAN, OF CINCINNATI, OHIO.

APPARATUS FOR FORMING PULLEY-MOLDS.

SPECIFICATION forming part of Letters Patent No. 593,644, dated November 16, 1897.

Application filed April 17, 1895. Serial No. 546,161. (No model.)

*To all whom it may concern:*

Be it known that I, JOHN E. DONOVAN, a citizen of the United States, and a resident of Cincinnati, in the county of Hamilton and State of Ohio, have invented certain new and useful Improvements in Apparatus for Forming Pulley-Molds, of which the following is a specification.

The object of my invention is to produce a cast-metal pulley cast in a single piece so that it may be turned out true, accurately fitted for the place desired, easily and accurately separated in halves to admit of its being placed in position upon the shaft without disturbing the shaft or disarranging its alinement, and when placed in position on the shaft will be practically as strong and durable as an integral pulley.

The invention consists in the novel means by which I am enabled to form the mold, with the peculiar patterns and cores by which the desired result is attained, all of which will be clearly understood from the following description of the invention, taken in connection with the accompanying drawings and the annexed claims, clearly pointing out the novel features of the invention.

Figure 1:
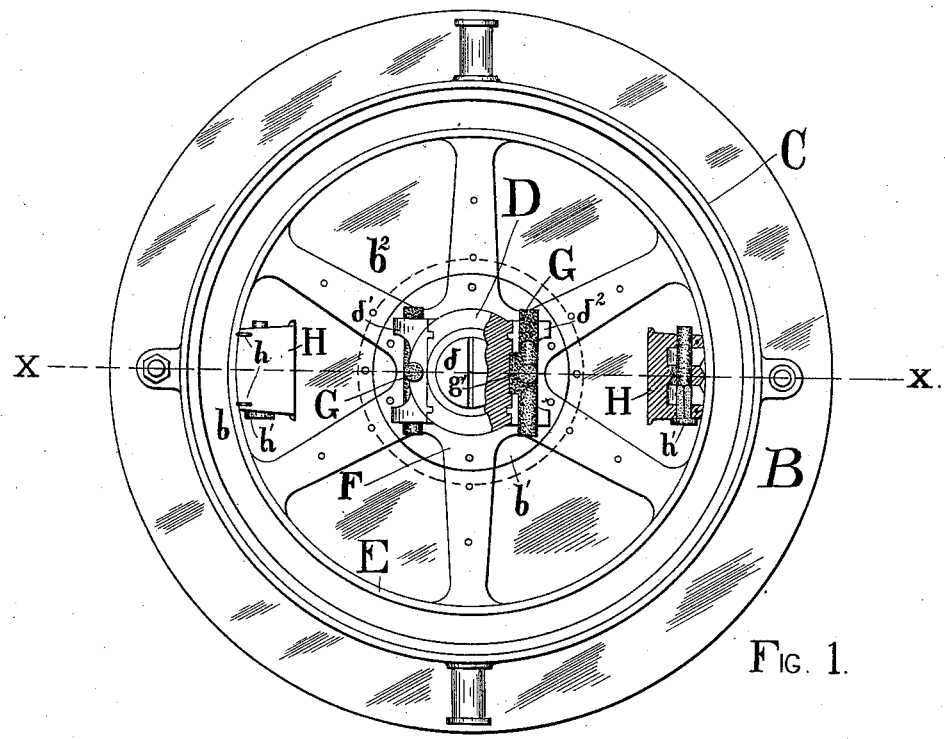
Figure 2:
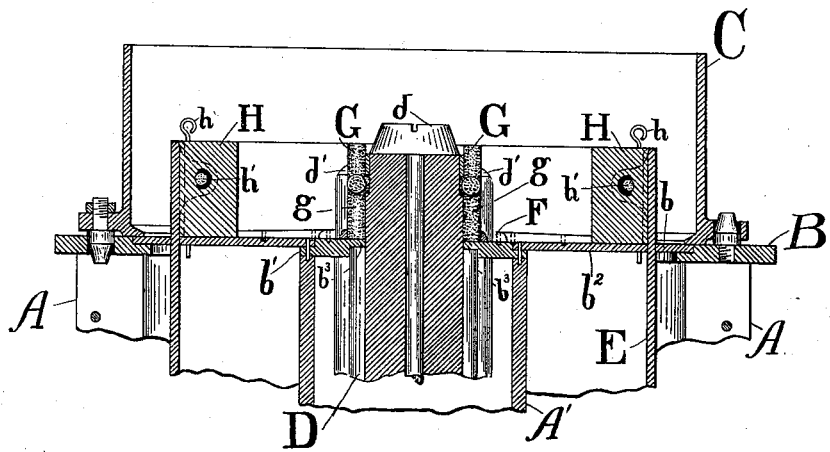
Figure 3:
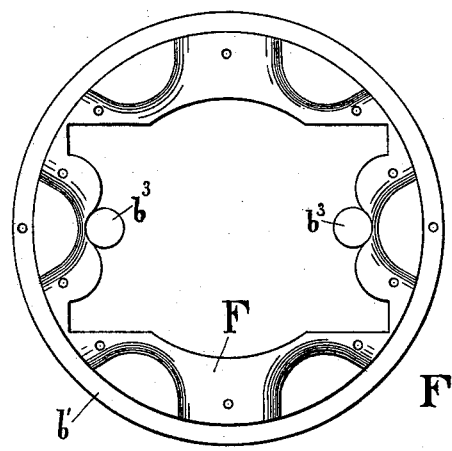
Figure 4:
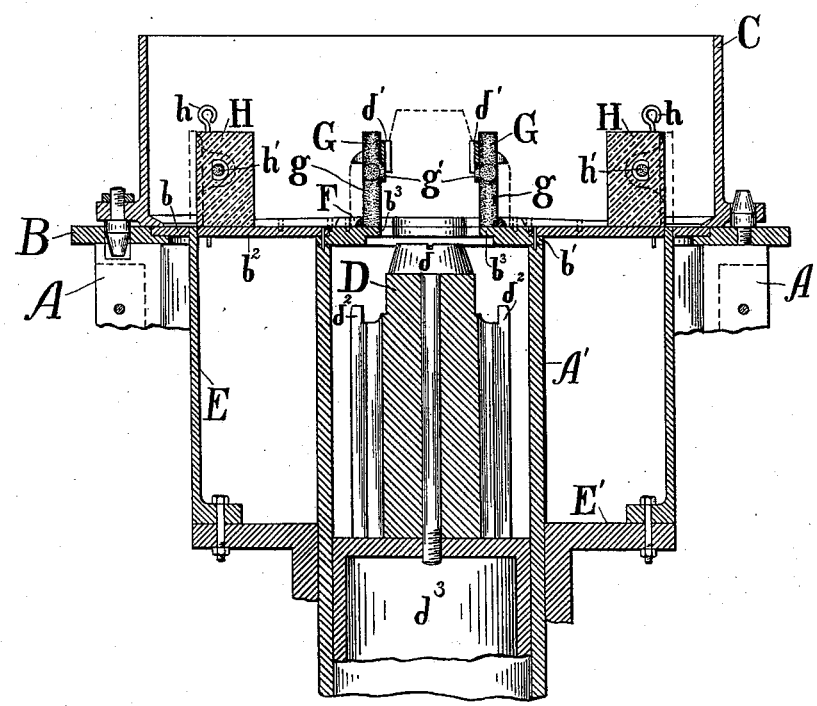
Figure 5:
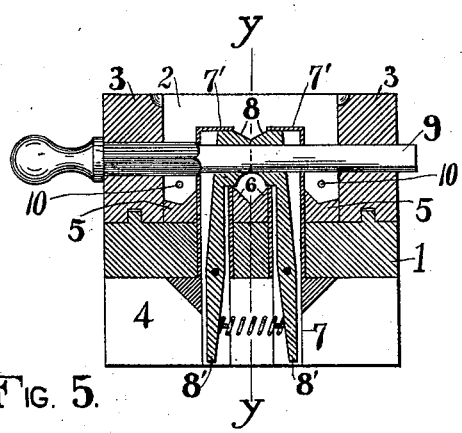
Figure 6:
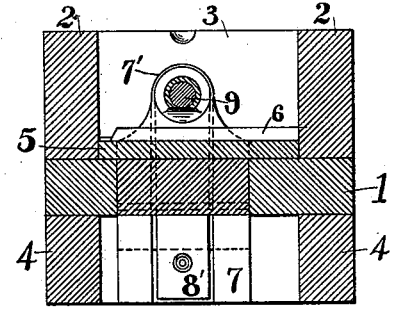
Figure 7:
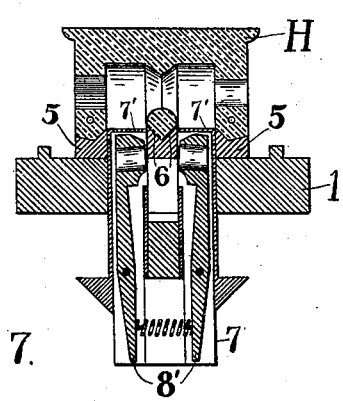
Figure 8:
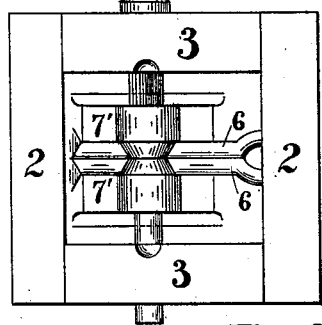
Figure 10:
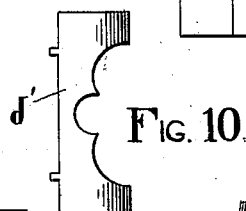
Figure 9:
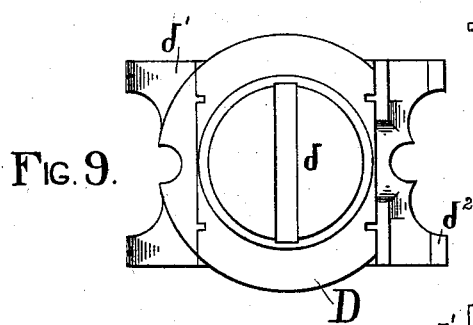
Figure 12:
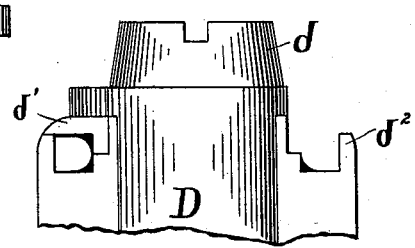
Figure 11:
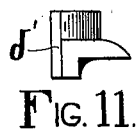
Figure 20:
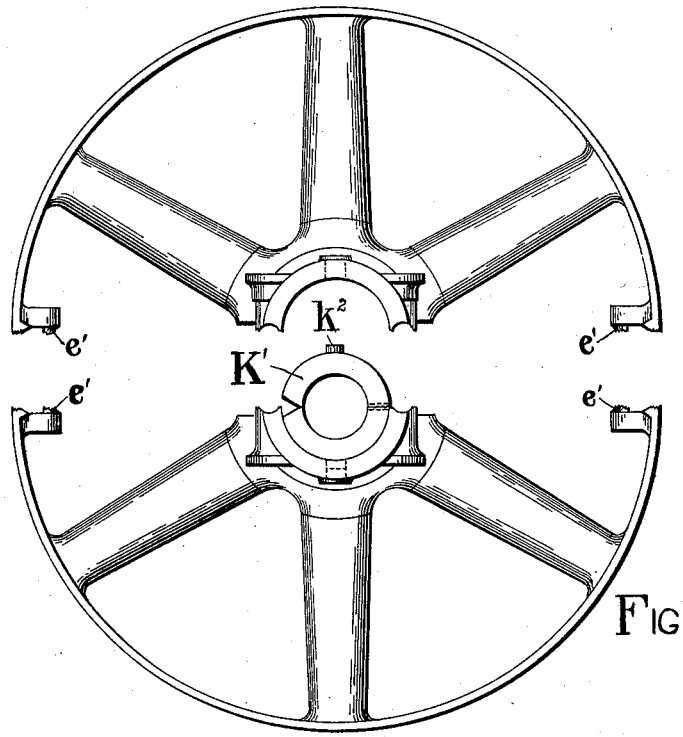
Figure 21:
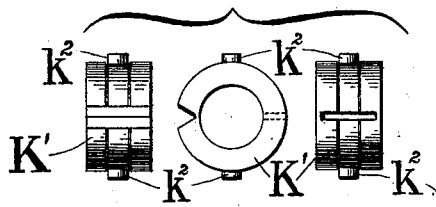
Figure 22:
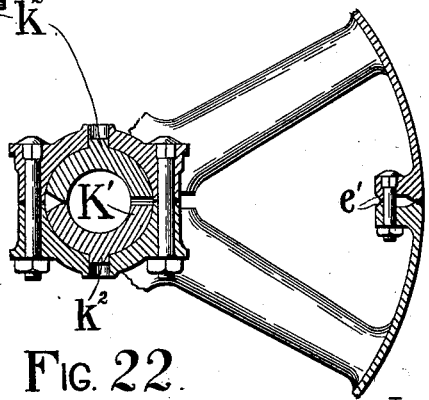
Figure 23:
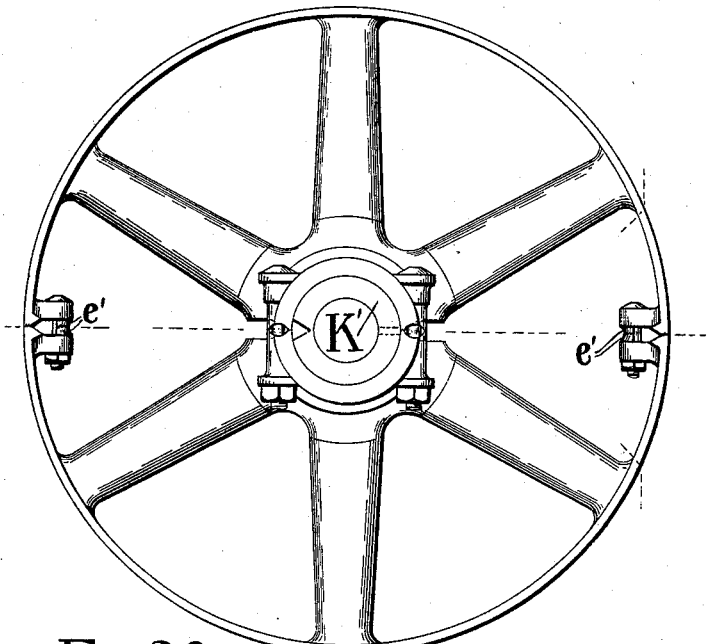
Figure 25:
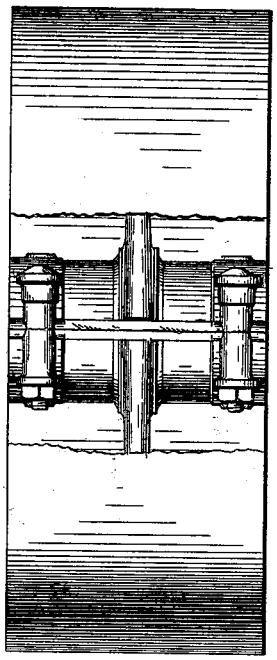
Figure 24:
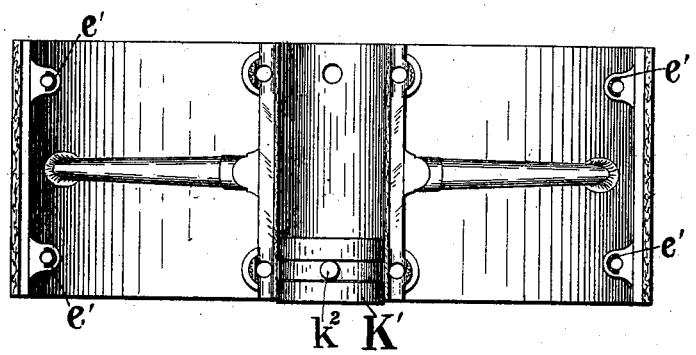
Figure 26:
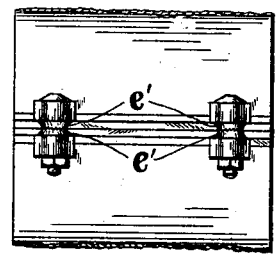
Figures 27, 31, 32:
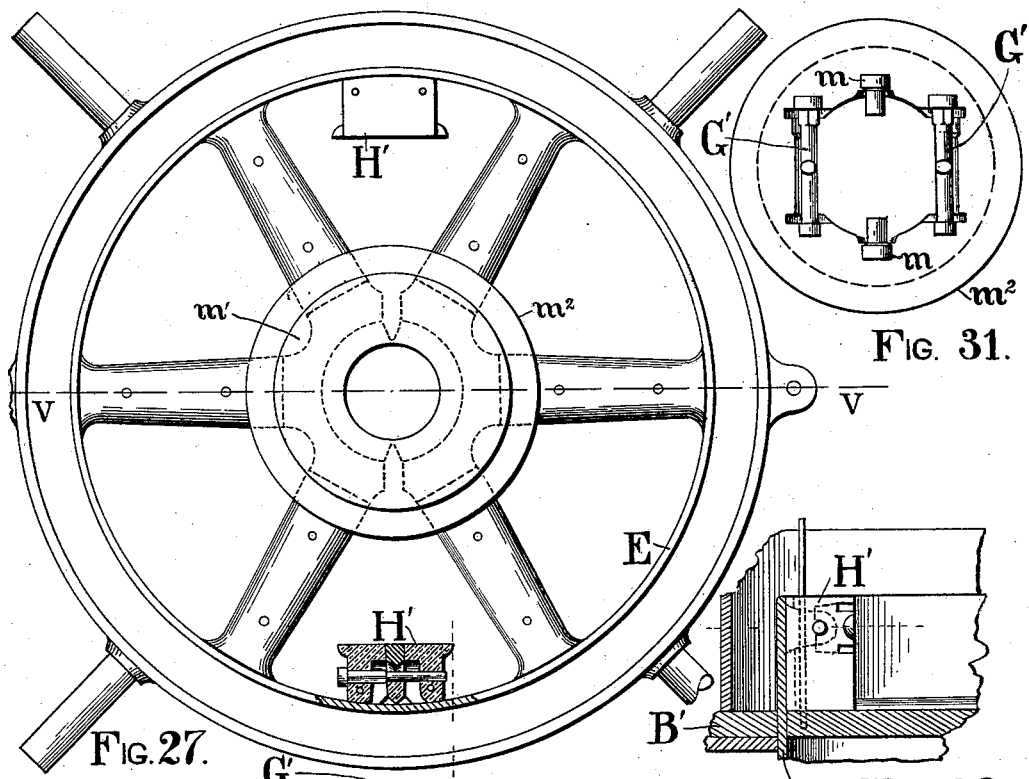
Figure 28:
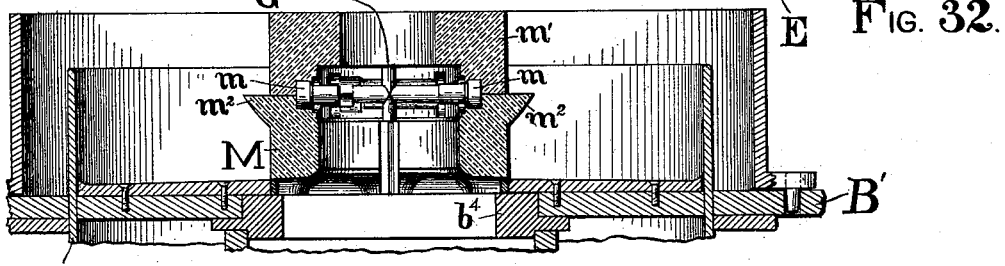
Figures 29, 30:
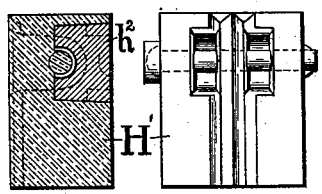

Referring to the accompanying drawings, in which like parts are indicated by similar reference-letters wherever they occur throughout the various views, Figure 1 is a plan view of a pulley-molding machine with the flask and patterns in position, part of the hub-patterns and the patterns for forming the bolt-lugs and ribs determining the lines upon which the hub and rim of the pulley will crack being shown in transverse section. Fig. 2 is a vertical diametrical section of the same, taken through line *x x* of Fig. 1, the cores for forming the hub-lugs and the controlling-lines for cracking the hub being shown in elevation. Fig. 3 is a plan view of the central templet of the follower-board with the pattern for the root of the arms secured upon it. Fig. 4 is a diametrical sectional view similar to Fig. 2, but with the hub-follower, core-print, and rim-pattern drawn down preparatory to removing the flask with the mold formed in it. The loose or green sand which would occupy the space in the flask around the patterns and around the dotted line of the rim and core-print is omitted for clearness. Fig. 5 is a vertical sectional view of the core-box and patterns for forming the core or mold section which is employed to form the mold for the bolting-lugs for the pulley-rim and the ribs which control the cracking of the rim, the parts being in the position ready to receive the core material. Fig. 6 is a view similar to Fig. 5, but taken at right angles to the view therein shown through line *y y*. Fig. 7 is a view similar to Fig. 5, but with the body of the core formed and the sides of the flask or core-box removed preparatory to removing the core to be placed in the molding-flask. Fig. 8 is a plan view of Fig. 6. Fig. 9 is a top or plan view of the hub-pattern with one of its members displaced. Fig. 10 is a top or plan view of the displaced member. Fig. 11 is an end elevation of the same. Fig. 12 is a side elevation of the hub-pattern as shown in Fig. 9. Fig. 13 is an edge elevation of my split pulley, the parts being separated. Fig. 14 is an inside plan or elevation of one half of the pulley with one of the bushings in position and shown in elevation. Fig. 15 is a detailed view looking at the inside rim of the pulley when the edges of the rim are bolted together. Fig. 16 is a detailed view taken in section through line *z z* of Fig. 14, but with the portions of the half-pulley bolted together. Fig. 17 is a side elevation of one of the pulley-bushings. Fig. 18 is a transverse vertical section through the same in the position it occupies as shown in Fig. 16. Fig. 19 is an edge elevation of the bushing, taken at right angles to the view shown in Fig. 17. Fig. 20 is an edge elevation similar to Fig. 13. Fig. 21 illustrates the form of bushing used in the modified form of pulley illustrated in Fig. 20, the central view being an edge elevation and the views upon each side of it being elevations of the opposite sides of the bushings. Fig. 22 is a detailed view, in transverse section, centrally through the bolting-lugs of the rim, hub, and the bushings upon one side of the pulley-arms. Fig. 23 is an edge elevation of the pulley bolted together for use. Fig. 24 is an inside elevation, similar to Fig. 14, of the modified form of pulley with one of the bushings in place, shown in elevation. Fig. 25 is an elevation of the pulley-face with a portion of the rim broken away to expose the hub, which is shown in elevation. Fig. 26 is a detailed view of a portion of the rim, looking from the inside, illustrating the means of bolting the halves together. Fig. 27 is a plan view of the follower-board with the flask seated upon it and the arm-patterns and mold-sections for forming the hub in position, the root of the arm being shown in dotted line and one of the mold-sections for forming the bolting-lugs and ribs for guiding the split in the pulley-rim shown in transverse section. Fig. 28 is a vertical transverse section through the view shown in Fig. 27, taken on line $v\,v$. Fig. 29 is a central vertical section, and Fig. 30 an inside elevation, of the mold-section for forming the rim-lugs and ribs controlling the cracking of the pulley-rim, these views being upon an enlarged scale. Fig. 31 is a plan view of the lower part of the mold-sections for the hub with the separable cores for forming the bolting-lugs and space for cracking the hub in position. Fig. 32 is a detailed view, in transverse section, illustrating the means of holding the rim-lug and rib-forming mold-sections in position.

The views Figs. 27 to 32, inclusive, illustrate the means for molding the modified form of pulley shown in Figs. 20 to 26, inclusive.

In Figs. 1 to 4, inclusive, I have shown the means for forming the half-mold for my split pulley upon a molding-machine of my own invention. Sufficient of the machine is shown to illustrate my method of placing the patterns and cores, withdrawing the patterns, and leaving the cores in position after the sand mold is formed.

The fixed parts of the machine consist of the husk or frame A, a central supporting-column A', only the upper parts of which are shown, and an outer ring B of the sectional follower-board which is secured upon the part or parts A. The outer removable ring $b$ of the follower-board is seated in an annular rabbet in the fixed ring B. The central section $b'$ of the follower-board (shown upon an enlarged scale in Fig. 3) rests upon the fixed column A', and the intermediate ring or section $b^2$ is seated in the annular rabbet or offset turned in the periphery of the central section $b'$. The half-flask C is shown seated upon the fixed ring B, and in Fig. 2 the hub-pattern D and rim-pattern E are shown elevated through the follower-board preparatory to forming the mold, while in Fig. 4 they are shown drawn down preparatory to removing the flask. The rim-pattern is shown secured upon a follower E', adapted to slide vertically outside of the central supporting-column A', and the hub-pattern secured upon the follower $d^3$, which is fitted to slide within the column.

The central ring $b'$ of the follower-board, as clearly shown in Fig. 3, is perforated, the perforation being the exact shape of the hub-pattern. (Shown clearly in Fig. 9.) Upon the central section $b'$ is secured the pattern F for the root of the pulley-arms. This pattern is also perforated to pass the hub-pattern and conforms in shape to the opening in the central section $b'$ of the follower-board, excepting the portions diametrically opposite each other, which expose the circular seats $b^3$ of the central section of the follower-board, which project inwardly to support the cores G, which form the openings through the bolting-lugs to receive the clamping-bolts and also the recess in the hub which controls the crack for separating the pulley-hub in two parts after it is cast.

The cores H, which form the lugs upon the inside of the pulley-rim through which the fastening-bolts pass to hold the split rim together and also form the ribs which guide or control the crack which separates the pulley-rim, are formed in the core-box represented in Figs. 5 to 8, inclusive. In Figs. 5 and 6 the core-box is shown ready to receive the material for forming the core. In Fig. 7 the sides of the core-box are removed and the lug-forming patterns drawn down preparatory to removing the core.

The core-forming patterns are of metal. The base 1 of the core-box has removable sides and ends 2 and 3 and is supported on base-pieces 4 at each end of the core-box. Upon the base or follower board of the core-box is fitted a metal pattern 5 and ribs 6, which form the face of the core that rests against the pulley-rim. The pattern which forms the mold-sections for the bolting-lugs and opening to receive the drift for cracking the rim is a metal box 7, fitted to slide through the base or follower board of the core-box and through the pattern for forming the face of the core. The upper end of box 7 is separated into the lug-forming patterns 7', the opposite faces of which are perforated to pass the cone-shaped pieces 8, which form the upper part of the pivoted arms 8', the arms being pivoted in the sides of the boxes. The pieces 8 are perforated, as are also the ends 3 of the core-box and the lug-patterns 7', to pass the metal bolt 9, which forms the opening in the mold-section to receive the core $h'$, which core forms the openings in the lugs to receive the bolts which secure the pulley-halves together. The sides 2 of the box are also transversely perforated at 10 to receive the wire rods or points $h$, which secure the rim-core in place upon the follower-board, as clearly shown in Figs. 1, 2, and 4.

The parts being in the position shown in Fig. 5, with the rods passed through the small perforations 10, the core material is rammed up tightly in the box, after which the bolt 9 and rods $h$ are removed, the levers 8' pressed together to withdraw the cone-shaped portions 8 within the lug-patterns 7', and the lug-patterns drawn down to the position shown in Fig. 7. The sides and ends of the core-box are then removed, the core H lifted off and after being properly baked placed in position upon the follower-board, as clearly seen in Figs. 1, 2, and 4, and the rods $h$ passed through the perforations in the core and perforations in the section $b^2$ of the follower-board, when the core $h'$, which is also of baked sand and of the shape of a carriage-bolt, is passed through the openings formed by the bolt 9 in the core, thus forming the baked-sand mold-section for the bolting-lugs and ribs that control the cracking through the rim. The hub-pattern D, with its screw-head $d$, which forms the core-print for the hub-bore, being elevated, as shown in Fig. 2, with the drawbacks $d'$ removed, the cores G are placed in position in the wings $d^2$ of the hub-pattern as seen in Fig. 1, and the drawbacks placed in position as clearly seen on the left-hand side of Figs. 1, 9, and 12.

The core G is in the shape of a cross the horizontal member of which is, like the core $h'$, in the form of a carriage-bolt—that is, having a square shaft upon one side and round upon the opposite side of the vertical member $g$, which weakens the hub, leaving but thin webs upon each side of it—to wit, the root of the arms and the hub—as clearly shown in Figs. 13 and 14. The vertical member $g$ of the core has projecting inwardly from it an oval-shaped stud $g'$ to form perforations in the opposite sides of the hub to receive the studs $k$, which project from the opposite sides of the bushing K, as shown clearly in Fig. 16, and also to receive the drift by which the hub is cracked to separate it in halves. The vertical member of the core G rests upon the inward projections $b^3$ of the central ring $b'$ of the follower-board. The parts being in the position indicated, the sand is rammed into the flask and around the parts up to about the level of the rim-pattern, firmly embedding the cores in place, when the rods $h$ are withdrawn and the flask rammed up to complete the half-mold. After the mold is completed the hub and rim patterns are withdrawn, as clearly indicated in Fig. 4, leaving the drawbacks $d'$ in the sand. The flask is then lifted off and the drawbacks $d'$ removed by drawing them toward the center. The other half is of course formed in the same way. After both half-molds are formed the core for the hub-bore is placed in position in one half of the mold and the half-flasks put together.

The bushings are also formed to be separated in halves, as clearly shown in Figs. 17 to 19, inclusive, and are molded with studs $k$, projecting out from opposite sides, and an elongated opening $k'$, separating the studs and nearly separating the bushings. After the bushing is dressed true upon the inside and outside it is broken in halves by inserting a drift in the openings $k'$. Two of these bushings are used in the pulleys, one at each end, one of them being shown inserted in place in the half-pulley, Fig. 14.

It will be seen by referring to Figs. 13 and 16 that each half of the pulley has irregular bearings upon opposite sides of the fastening-bolts, so that when brought together and bolted, as shown in Fig. 16, there are bearings upon each side of the bolts, so that they may be firmly tightened up without exerting any strain upon the pulley. This is particularly advantageous in the rim-bolts, as the bearing between the lugs $e$ prevents any tendency of the rim $E^2$ to be thrown out of shape or the lugs to break off in tightening up. By making the lug-openings upon one half angular and circular upon the opposite half of the pulley I am enabled to use the ordinary carriage-bolt for tightening the pulley together, which avoids the necessity of using nuts upon each end of the bolt and holding one nut while the other is being tightened up, so that the pulley may be very quickly placed in position or removed when desired.

In the modification of my invention shown in Figs. 20 to 32, inclusive, the pulley is substantially the same as hereinbefore described, but the means for forming the mold is slightly different. The sectional arm-patterns in this case, as shown in Figs. 27 and 28, are secured upon the follower-board and project over a central support $b^4$. The root of the arms, as shown in dotted line, Fig. 27, is formed in the base of the hub mold-section, which in this case is formed as a core of baked sand and in two parts. The lower part M has also recesses formed in its top to receive one-half of the cores $G'$ and also recesses to receive plugs $m$, which form openings through the hub to receive the studs $k^2$ of the bushings. The upper half of the hub-pattern $m'$ is centrally perforated to seat and steady the core which forms the bore in the hub. Its lower face is formed like the part M to receive the upper half of the core-patterns $G'$ and plugs $m$.

The core $H'$ for forming the rim-lugs and ribs for controlling the cracking of the pulley-rim, as shown in Figs. 29 and 30, differs from the core H, previously described, mainly in the fact that the chill-plate $h^2$ is employed to form the reduced part $e'$ between the lugs upon opposite sides of the pulley, and the bushings $K'$, Fig. 21, instead of being separated between the studs which hold the bushing in place, are separated in a plane at right angles to it, the line of cracking being controlled by a V-shaped groove upon one side of the bushing and an elongated perforation upon the opposite side. In this case, also, the root of the arms and the pulley-hub are nearly separated by practically V-shaped openings, as seen in dotted line, Fig. 27, the openings being formed by ribs in the core, as seen in Fig. 28. The core has also an outwardly-projecting flange $m^2$, by which it is conveniently handled to center it truly over the inwardly-projecting ends of the arm-patterns, which steady it in place and prevent it from moving while the green-sand mold is being formed around it.

My pulley can be readily adapted to any irregularities in the shafts by slightly dressing away the fractured parts of the hub and bushings, and ordinarily the hub is so firmly compressed upon the shaft that slipping is prevented; but when the pulley is to be used for very heavy duty the meeting edges of the bushings may be dressed off to receive a key seated in the shaft.

The claims herein do not concern themselves with the molding-machine viewed as to its provision for separating the pattern from the mold by withdrawing the pattern downwardly through the follower-board, it being understood, however, that of course such system is preferable to separating the mold from the pattern by ordinary lifting of mold or drawing of pattern.

What I claim is—

1. In apparatus for forming pulley-molds, the combination, substantially as set forth, of a hub-pattern having at each side a pair of projecting lug portions with upwardly open horizontal core-seats, cruciform cores with their vertical members disposed between the two lug portions of the pairs and with their horizontal members resting in said core-seats, and draw-backs disposed over said lug portions and engaging over the horizontal members of said cores.

2. In apparatus for forming pulley-molds, the combination, substantially as set forth, of a core having cavities to form a pair of rim-lugs and having a perforation extending through the walls of said cavities, a core the shape of a bolt separably disposed in said perforation and crossing said cavities, rods removably disposed in perforations in said first-mentioned core at right angles to the axis of said bolt-shaped core, and a follower-board supporting said first-mentioned core and having apertures engaged by said rods.

3. The combination, substantially as set forth, of a supporting-board, a pulley-rim pattern projecting above the same, rim-lug cores supported on said board against the inner surface of said rim-pattern, projections detachably uniting said cores to said board and holding said cores in position against said rim-pattern, a hub-pattern projecting upwardly from said board, and cores resting on said board and detachably held against said hub-pattern by portions of the latter engaging outside said cores.

JOHN E. DONOVAN.

Witnesses:
GEO. J. MURRAY,
EMMA LYFORD.